United States Patent
Wu (10) Patent No.: US 11,285,408 B2
(45) Date of Patent: Mar. 29, 2022

(54) CLEANING BUCKET STRUCTURE CAPABLE FOR AUTOMATICALLY PURIFYING FOUL WATER

(71) Applicant: Chang-Hsin Wu, Huwei Township, Yunlin County (TW)

(72) Inventor: Chang-Hsin Wu, Huwei Township, Yunlin County (TW)

(*) Notice: Subject to any disclaimer, the term of this patent is extended or adjusted under 35 U.S.C. 154(b) by 130 days.

(21) Appl. No.: 16/681,848

(22) Filed: Nov. 13, 2019

(65) Prior Publication Data
US 2020/0289964 A1    Sep. 17, 2020

(51) Int. Cl.
*B01D 29/01*     (2006.01)
*B01D 35/26*     (2006.01)
*A47L 13/58*     (2006.01)

(52) U.S. Cl.
CPC ............ *B01D 29/018* (2013.01); *A47L 13/58* (2013.01); *B01D 35/26* (2013.01)

(58) Field of Classification Search
CPC ...... B01D 29/018; B01D 29/01; B01D 35/26; A47L 13/58; A47L 13/502; A47L 13/50; A47L 13/59; A47L 13/60; B08B 3/04; B08B 3/14; A47J 47/18
USPC ......................................................... 210/238
See application file for complete search history.

(56) References Cited

U.S. PATENT DOCUMENTS

| | | | | |
|---|---|---|---|---|
| 4,798,307 A * | 1/1989 | Evrard | ..................... | A47L 13/58 15/264 |
| 6,158,258 A * | 12/2000 | Bowman | ................. | A47L 13/60 134/191 |
| 6,279,195 B1 * | 8/2001 | Biggs | ...................... | A47L 13/59 15/260 |
| 6,976,286 B1 * | 12/2005 | Sanabria | ................. | A47J 47/18 134/186 |
| 9,226,640 B1 * | 1/2016 | Wulff | ...................... | A47L 13/50 |

FOREIGN PATENT DOCUMENTS

| CN | 107684406 A | * | 2/2018 | ............. A47L 13/58 |
|---|---|---|---|---|
| CN | 108451460 A | * | 8/2018 | ............. A47L 13/59 |

OTHER PUBLICATIONS

CN 107684406 A English description, Feb. 2018, Zhu Chenhui et al.*
CN 108451460 A English description, Aug. 2018, Zhang Juhong et al.*

* cited by examiner

*Primary Examiner* — Akash K Varma (57) ABSTRACT

A cleaning bucket structure for automatically purifying foul water is provides. The cleaning bucket structure includes an outer bucket, an inner bucket, a transmission member, a pumping member, a filtering member and a covering plate. The outer bucket has a receiving space. The inner bucket has a diameter which is smaller than a diameter of the outer bucket and is disposed in the receiving space of the outer bucket. The transmission member is disposed in the inner bucket. The pumping member is disposed in the inner bucket for receiving the transmission member therein. The filtering member is disposed in the inner bucket and surrounding the transmission member and the pumping member. The covering plate is disposed in the inner bucket and above the filtering member and includes a plurality of openings.

9 Claims, 8 Drawing Sheets

CLEANING BUCKET STRUCTURE CAPABLE FOR AUTOMATICALLY PURIFYING FOUL WATER

FIELD OF THE INVENTION

The present invention relates to a water purification device, and more particularly to a cleaning bucket structure capable for automatically purifying foul water.

BACKGROUND OF THE INVENTION

The conventional clean method is that a traditional mop is put in a bucket receiving clean water to be wet and then the wet mop is dried by hand after sweeping the floor so as to clean the floor. It may clean the dirty floor, bacteria or dust which is hard to sweep away. Furthermore, some of detergents may be added into the clean water received in the bucket to make the clean effect better.

However, the conventional bucket only has one function for receiving the water. After the mop is put into the bucket, the mop is handled by the user's hand with vibration so as to wash out the dust attached on the cleaning cloth of the mop in the vibrated clean water. After washing out the dust and making the clean water dirty, the clean water becomes foul water and there are more and more dust in the bucket. When the user wants to clean the cleaning cloth of the mop, the foul water must be poured out and then another clean water must be filled with in the bucket again. That is, the water in the bucket must be replaced for each or many times' cleaning. It is not environmental friendly, consumes manual labor and extends cleaning time.

In view of the foregoing circumstances, the inventor has invested a lot of time to study the relevant knowledge, compare the pros and cons, research and develop related products. After quite many experiments and tests, the "cleaning bucket structure" of this invention is eventually launched to improve the foregoing shortcomings, to meet the public use.

SUMMARY OF THE INVENTION

An object of this invention is providing a cleaning bucket structure for automatically purifying foul water. It has simplified structure, is easy to operate, and recycle the clean water after purifying the foul water to achieve the effect of environmental protection.

To achieve above objects, a cleaning bucket structure for automatically purifying foul water may comprise an outer bucket, having a receiving space; an inner bucket, having a diameter which is smaller than a diameter of the outer bucket and disposed in the receiving space of the outer bucket; a transmission member, disposed in the inner bucket; a pumping member, disposed in the inner bucket for receiving the transmission member therein; a filtering member, disposed in the inner bucket and surrounding the transmission member and the pumping member; and a covering plate, disposed in the inner bucket and above the filtering member, the covering plate includes a plurality of openings.

In some embodiments, the transmission member includes a transmission rod, a rotation barrel, a driving barrel, a cover barrel, a linking barrel, and a positioning rod, the linking barrel is fixed in the pumping member, the positioning rod is inserted in a lower end of the linking barrel and positioned at an inner center of the outer bucket, the rotation barrel is disposed in the linking barrel and a plurality of guiding slots are formed at a peripheral wall, the driving barrel is disposed in the rotation barrel and has a driving hole formed at a top surface thereof for providing the transmission rod to insert, a plurality of convex portions are formed at an outer peripheral wall of the driving barrel, the convex portions are arranged in the corresponding guiding slots respectively, and the cover barrel covers on the linking barrel and a bottom end thereof is adjacent to or contacts with a top end of the rotation barrel.

In some embodiments, a plurality of hooking holes are formed at an upper end of the linking barrel, a plurality of hooking elements are formed at an inner peripheral wall of the cover barrel, and the hooking elements are respectively hooked and fixed to the corresponding hooking holes.

In some embodiments, an outer extension section is extended from the lower end of the linking barrel, a diameter of the outer extension section is smaller than a diameter of the linking barrel, two locking portions are respectively formed at two opposite sides of an outer peripheral wall of the outer extension section, an inner extension section is concavely and upwardly formed inside a bottom center of the pumping member, two recesses are respectively formed at two opposite sides of an inner peripheral wall of the inner extension section, the outer extension section inserts into the inner extension section, and the locking portions are respectively fixed to the corresponding recesses.

In some embodiments, a plurality of positioning grooves are formed at outside of the peripheral wall of the rotation barrel, a plurality of positioning ribs are axially disposed at an inner peripheral wall of the linking barrel, and the positioning ribs are respectively disposed corresponding to the positioning grooves.

In some embodiments, at least one blade is spirally formed at the outer peripheral wall of the inner extension of the pumping member.

In some embodiments, a plurality of pumping plates are axially disposed at the outer peripheral wall of the linking barrel.

In some embodiments, the cleaning bucket structure further comprises a handle disposed at an upper end of the inner bucket.

In some embodiments, an inclined surface is formed at a top end of the pumping member.

In some embodiments, a wedging ring portion is formed at an upper end of the inner bucket for wedging and fixing to an upper end of the outer bucket.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Referring now to the drawings where like characteristics and features among the various figures are denoted by like reference characters.

Please refer to FIGS. 1 to 8, the cleaning bucket structure 100 for automatically purifying foul water of the present invention comprises an outer bucket 1, an inner bucket 2, a transmission member 3, a pumping member 4, a filtering member 5, a covering plate 6 and a handle 7.

Figure 1:
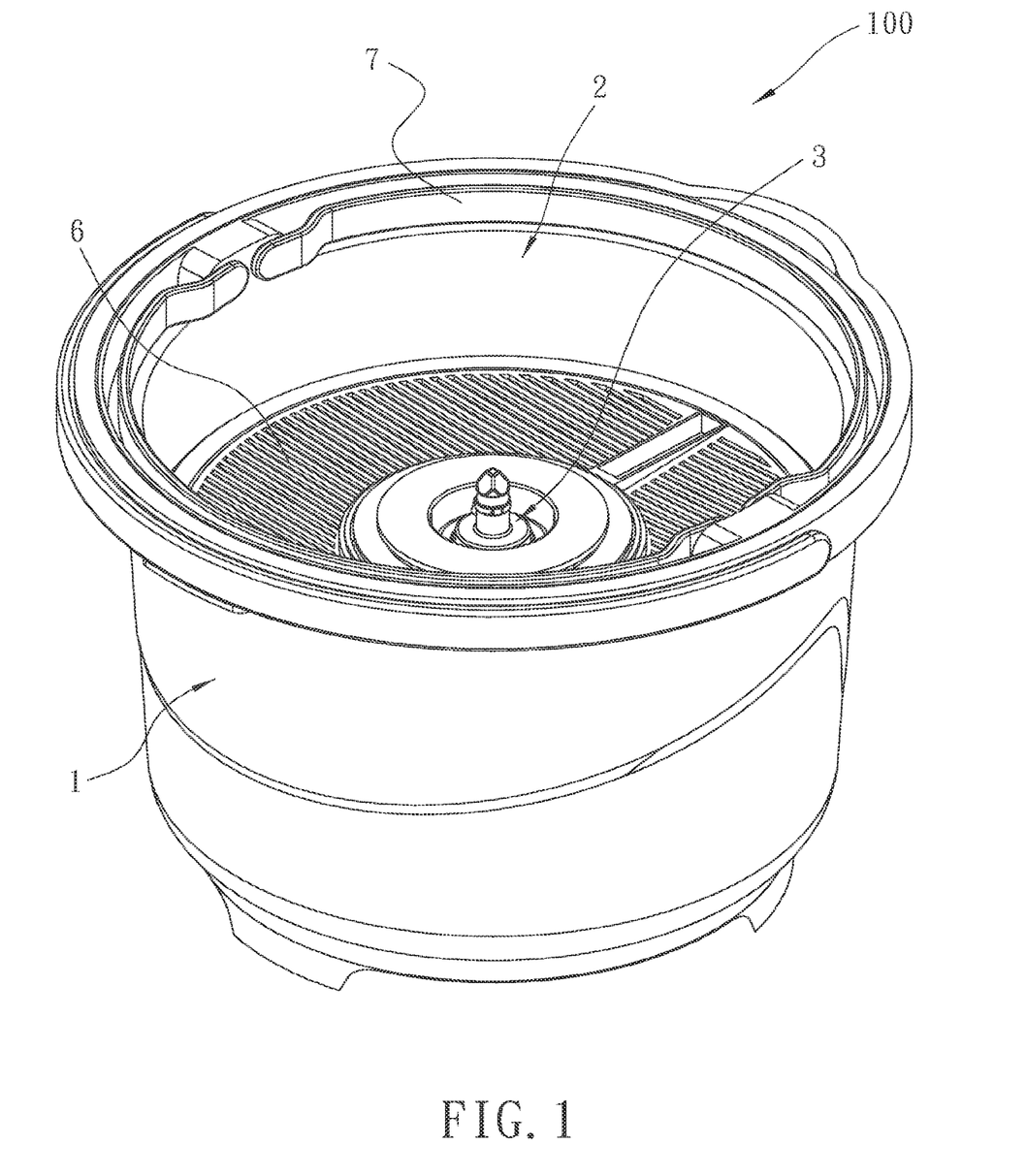
FIG. 1 is a perspective view of a cleaning bucket structure for automatically purifying foul water of the present invention.
Figure 2:
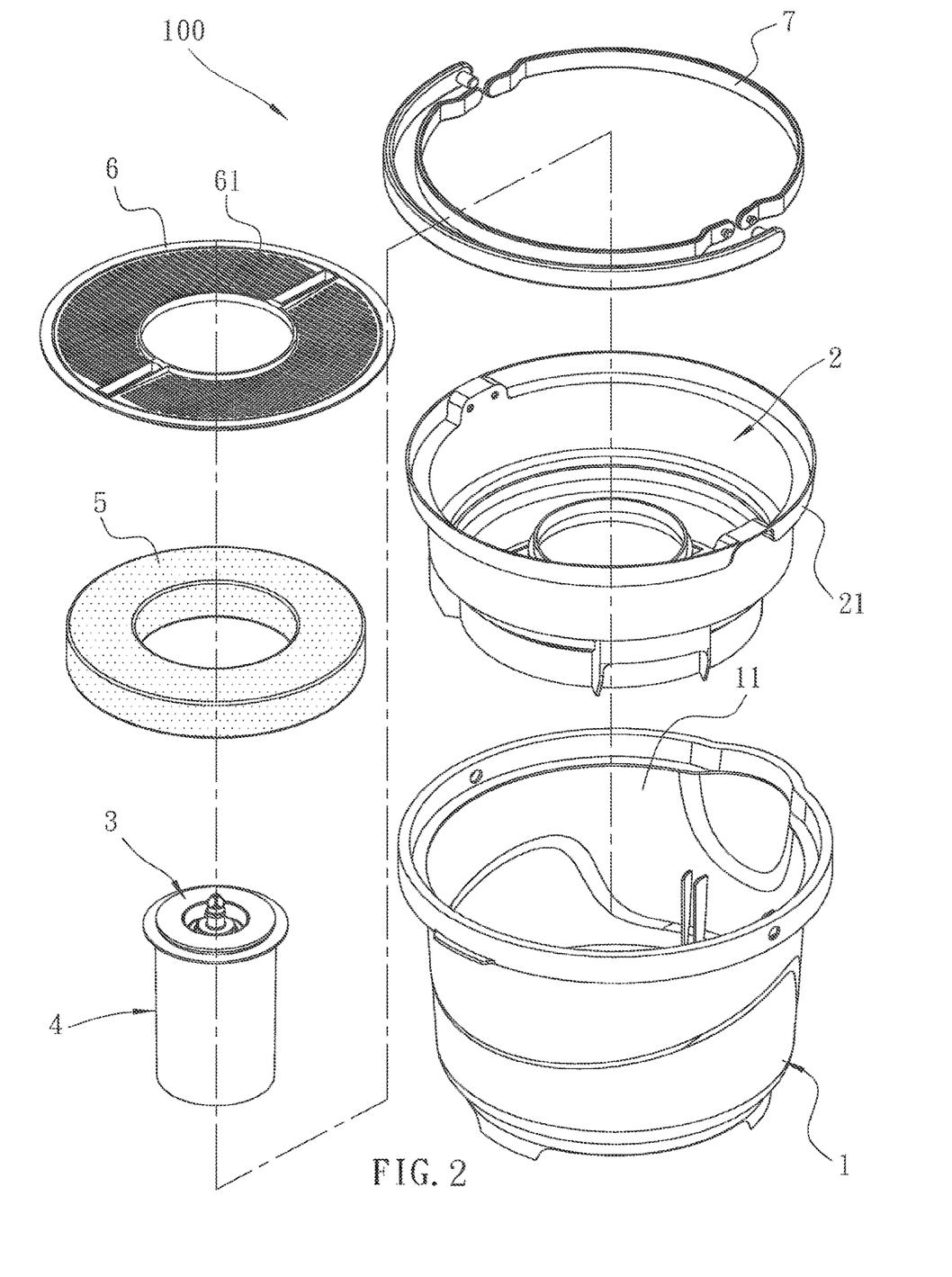
FIG. 2 is an exploded view of the cleaning bucket structure of the present invention.

The outer bucket 1 has a receiving space 11.

The inner bucket 2 has a diameter which is smaller than a diameter of the outer bucket 1. The inner bucket 2 is disposed in the receiving space 11 of the outer bucket 1. In some embodiments, a wedging ring portion 21 is formed at an upper end of the inner bucket 2 for wedging and fixing to an upper end of the outer bucket 1.

The transmission member 3 is disposed in the inner bucket 2. The pumping member 4 is disposed in the inner bucket 2 for receiving the transmission member 3 therein. The filtering member 5 is disposed in the inner bucket 2 and surrounding the transmission member 3 and the pumping member 4.

The covering plate 6 is disposed in the inner bucket 2 and above the filtering member 5. The covering plate 6 includes a plurality of openings 61.

The handle 7 is disposed at an upper end of the inner bucket 2. In some embodiments, the handle 7 is fixed in the wedging ring portion 21 of the inner bucket 2.

Figure 3:
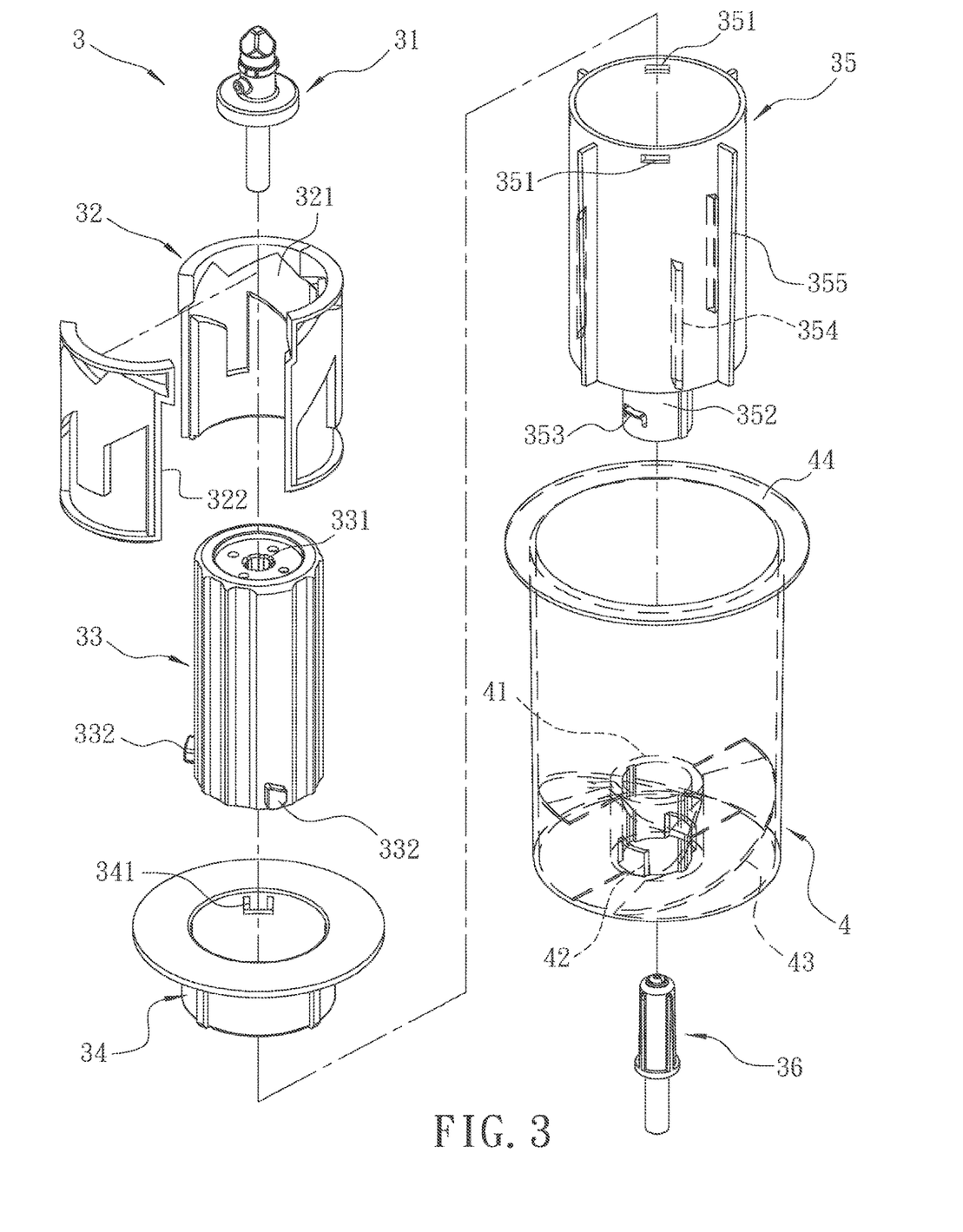
FIG. 3 is an exploded view of a transmission member of the cleaning bucket structure of the present invention.
Figure 4:
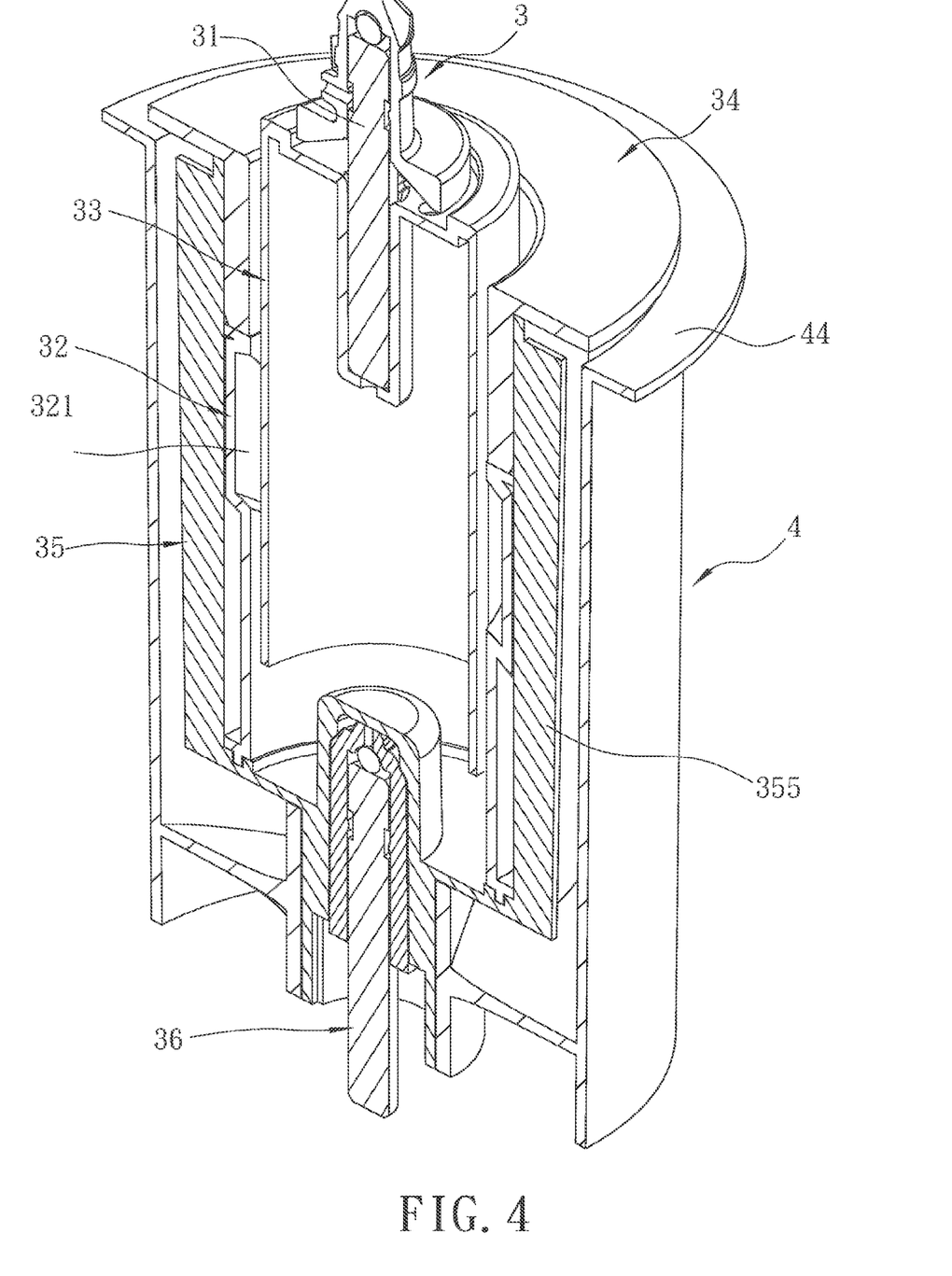
FIG. 4 is a cross-sectional view of the transmission member of the cleaning bucket structure of the present invention.
Figure 5:
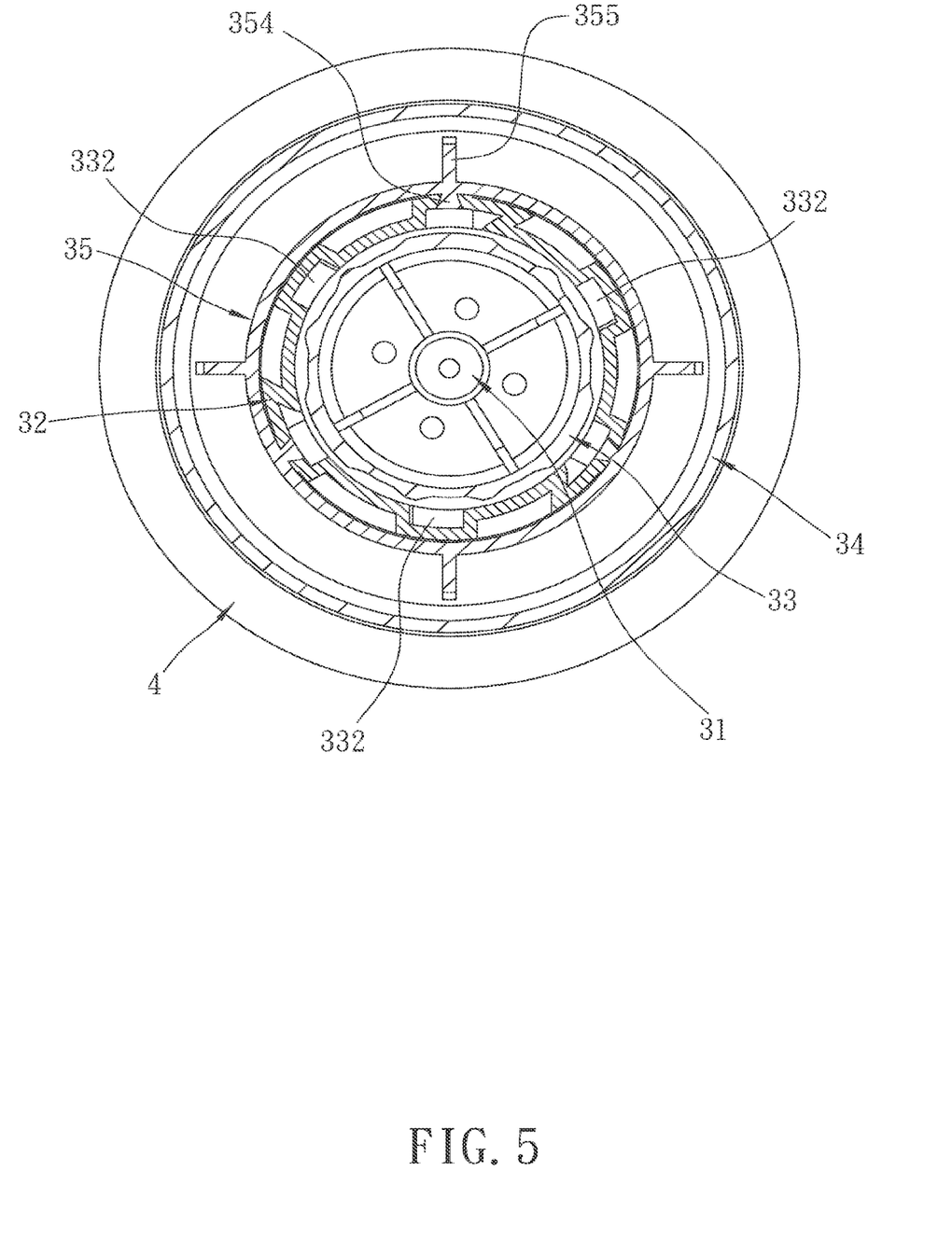
FIG. 5 is a top view of the transmission member of the cleaning bucket structure of the present invention.

Please refer to FIGS. 3 to 5, the transmission member 3 includes a transmission rod 31, a rotation barrel 32, a driving barrel 33, a cover barrel 34, a linking barrel 35 and a positioning rod 36. The linking barrel 35 is fixed in the pumping member 4. The positioning rod 36 is inserted in a lower end of the linking barrel 35 and positioned at an inner center of the outer bucket 1. The rotation barrel 32 is disposed in the linking barrel 35 and a plurality of guiding slots 321 are formed at a peripheral wall. The driving barrel 33 is disposed in the rotation barrel 32 and has a driving hole 331 formed at a top surface thereof for providing the transmission rod 31 to insert. A plurality of convex portions 332 are formed at an outer peripheral wall of the driving barrel 33. The convex portions 332 are arranged in the corresponding guiding slots 321 respectively. The cover barrel 34 covers on the linking barrel 35 and a bottom end thereof is adjacent to or contacts with a top end of the rotation barrel 32.

In some embodiments, a plurality of hooking holes 351 are formed at an upper end of the linking barrel 35 and a plurality of hooking elements 341 are formed at an inner peripheral wall of the cover barrel 34. And the hooking elements 341 are respectively hooked and fixed to the corresponding hooking holes 351.

In some embodiments, an outer extension section 352 is extended from the lower end of the linking barrel 35 and a diameter of the outer extension section 352 is smaller than a diameter of the linking barrel 35. Two locking portions 353 are respectively formed at two opposite sides of an outer peripheral wall of the outer extension section 352. An inner extension section 41 is concavely and upwardly formed inside a bottom center of the pumping member 4 and two recesses 42 are respectively formed at two opposite sides of an inner peripheral wall of the inner extension section 41. The outer extension section 352 inserts into the inner extension section 41 and the locking portions 353 are respectively fixed to the corresponding recesses 42.

In some embodiments, a plurality of positioning grooves 322 are formed at outside of the peripheral wall of the rotation barrel 32 and a plurality of positioning ribs 354 are axially disposed at an inner peripheral wall of the linking barrel 35. And the positioning ribs 354 are respectively disposed corresponding to the positioning grooves 322.

In some embodiments, a plurality of pumping plates 355 are axially disposed at the outer peripheral wall of the linking barrel 35 so that the inner peripheral wall of the pumping member 4 and the linking barrel 35 are spaced apart each other and the pumping plates 355 may guide the water flow while the linking barrel 35 is rotating. In some embodiments, at least one blade 43 is spirally formed at the outer peripheral wall of the inner extension 41 of the pumping member 4. In some embodiments, shown as in FIGS. 3 and 4, an inclined surface 44 is formed at a top end of the pumping member 4.

Figure 6:
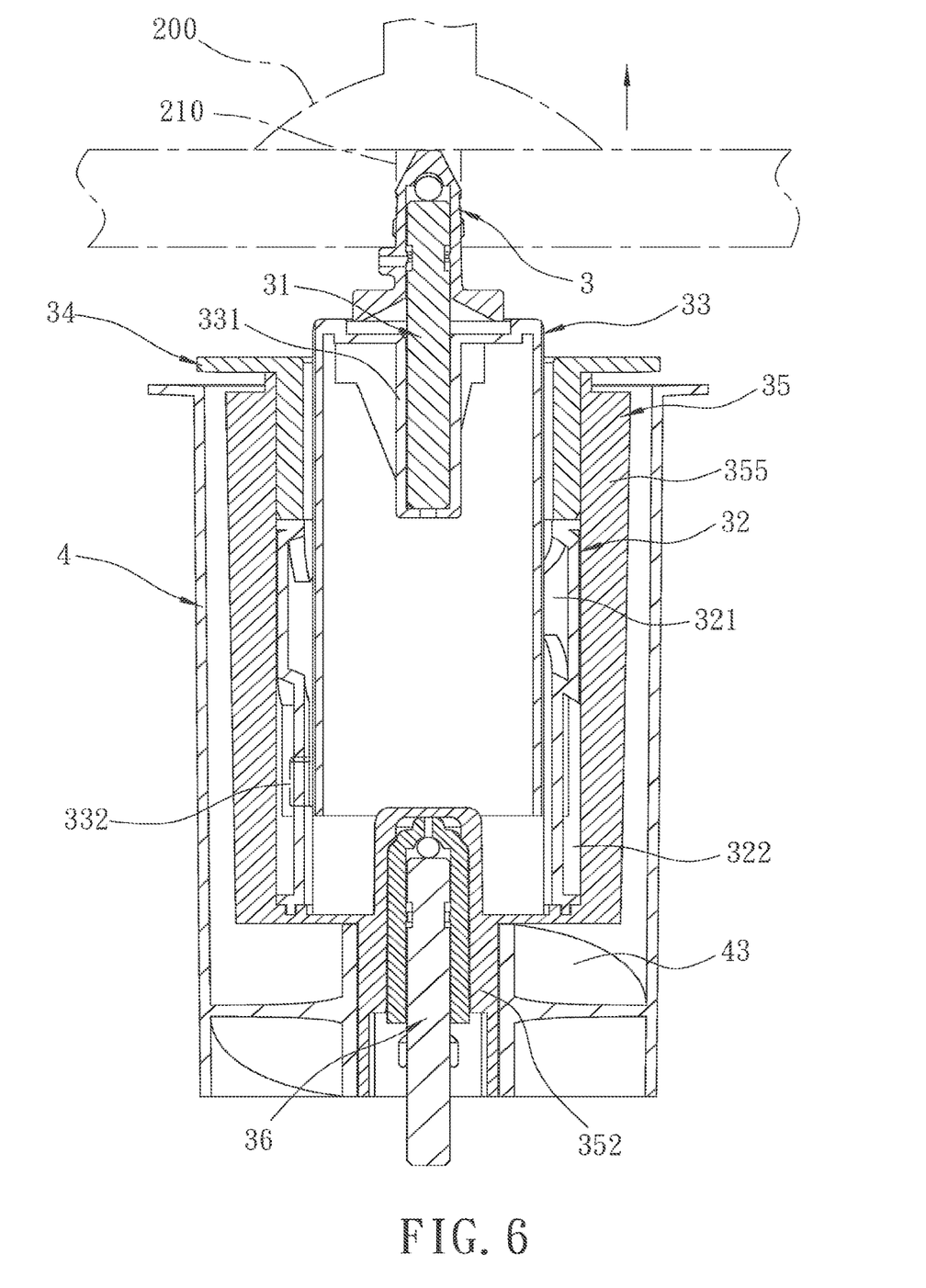
FIG. 6 is an operational view of the transmission member of the cleaning bucket structure of the present invention while cooperating with a mop.
Figure 7:
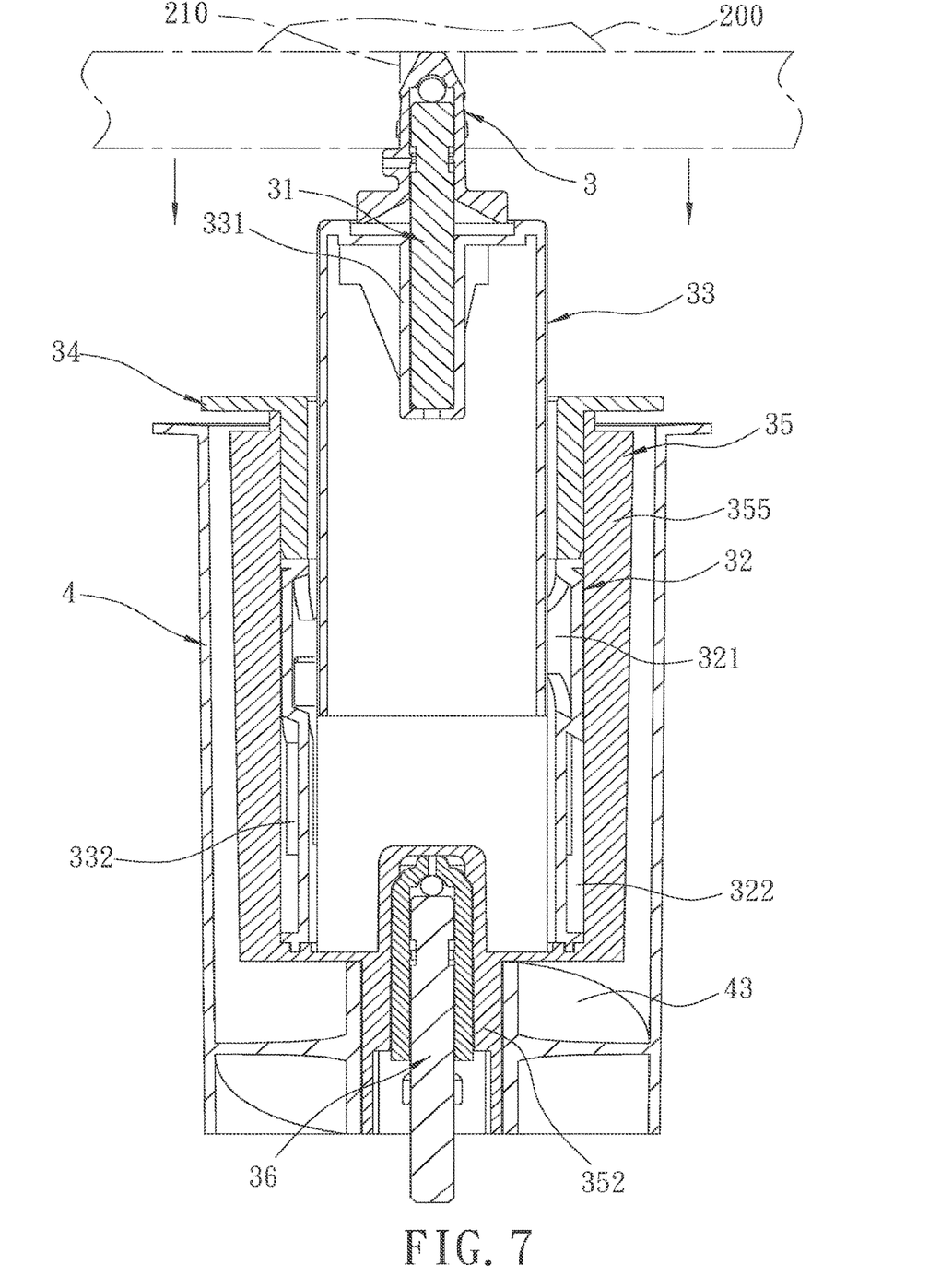
FIG. 7 is an operational view of the transmission member of the cleaning bucket structure of the present invention while cooperating with the mop.
Figure 8:
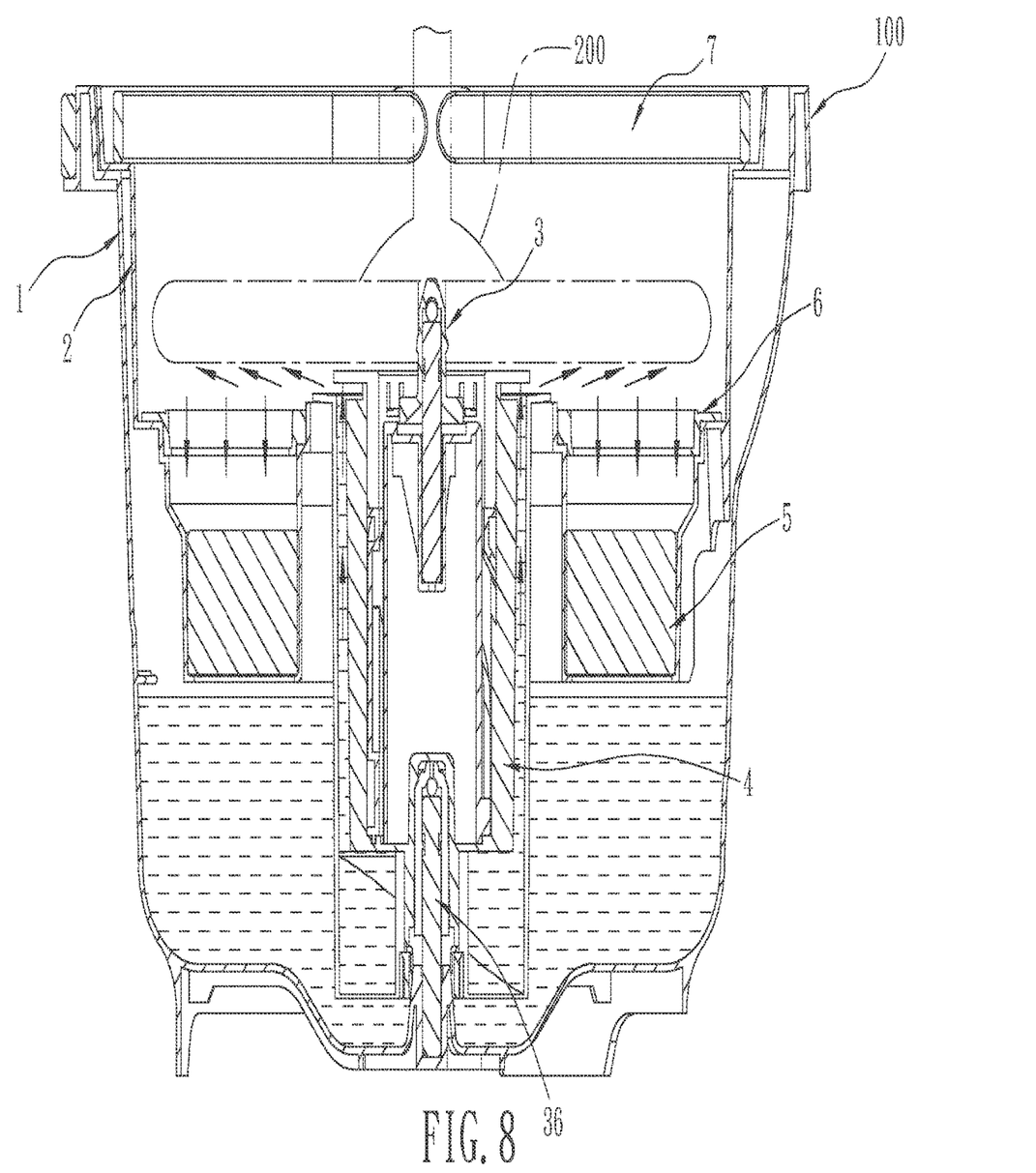
FIG. 8 is an operational view of the cleaning bucket structure of the present invention while cooperating with the mop.

Please refer to FIGS. 6 to 8, a mop 200 has a central hole 210 for providing the transmission rod 31 to insert. Accordingly, after pulling up (shown as in FIG. 6) or pressing down (shown as in FIG. 7) the mop 200, the transmission rod 31 and the driving barrel 33 are driven to pulling up or press down so that the convex portions 332 of the driving barrel 32 are cyclically moved in the guiding slots 321 of the rotation barrel 32 correspondingly to make the whole rotation barrel 32 rotate. In addition, the positioning grooves 322 of the rotation barrel 32 and the positioning ribs 354 of the linking barrel 35 are engaged with each other so as to drive the linking barrel 35, the pumping member 4 and the cover barrel 34 to rotate.

In the result, please refer to FIG. 8, due to the centrifugal force, the foul water on the mop 200 may come off the mop 200 and flows to the filtering member 5 through the openings 61 of the covering plate 6. And then, the foul water is purified to be the clean water by the filtering member 5 and the clean water flows to the receiving space 11 which is between the inner bucket 2 and the outer bucket 1. Therefore, it has simplified structure, is easy to operate, and recycle the clean water after purifying the foul water to achieve the effect of environmental protection.

Additionally, part of foul water on the mop 200 may flow downwardly in the pumping member 4 through the gap between the linking barrel 35 and the pumping member 4. And then, due to the rotation of the pumping member 4 driven by the transmission member 3, the at least one blade 43 of the pumping member 4 may push the foul water through the gap between the linking barrel 35 and the pumping member 4 to flow upwardly so that the foul water may flow to the filtering member 5 through the inclined surface 44 of the pumping member 4 and the openings 61 of the covering plate 6. The foul water is purified to be the clean water by the filtering member 5 and the clean water flows to the receiving space 11 which is between the inner bucket 2 and the outer bucket 1. Therefore, it has simplified structure, is easy to operate, and recycle the clean water after purifying the foul water to achieve the effect of environmental protection.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A cleaning bucket structure for automatically purifying foul water, comprising:
    an outer bucket, having a receiving space;
    an inner bucket, having a diameter which is smaller than a diameter of the outer bucket, and disposed in the receiving space of the outer bucket;
    a transmission member, disposed in the inner bucket;
    a pumping member, disposed in the inner bucket for receiving the transmission member therein;
    a filtering member, disposed in the inner bucket and surrounding the transmission member and the pumping member; and
    a covering plate, disposed in the inner bucket and above the filtering member, the covering plate includes a plurality of openings,
    wherein the transmission member includes a transmission rod, a rotation barrel, a driving barrel, a cover barrel, a linking barrel and a positioning rod, the linking barrel is fixed in the pumping member, the positioning rod is inserted in a lower end of the linking barrel and positioned at an inner center of the outer bucket, the rotation barrel is disposed in the linking barrel and a plurality of guiding slots is formed at a peripheral wall of the rotation barrel, the driving barrel is disposed in the rotation barrel and has a driving hole formed at a top surface of the driving barrel for providing the transmission rod to insert, a plurality of convex portions is formed at an outer peripheral wall of the driving barrel, the plurality of convex portions are arranged in the corresponding plurality of guiding slots respectively, and the cover barrel covers on the linking barrel, and a bottom end of the cover barrel is adjacent to or contacts with a top end of the rotation barrel.

2. The cleaning bucket structure as claimed in claim 1, wherein a plurality of hooking holes is formed at an upper end of the linking barrel, a plurality of hooking elements is formed at an inner peripheral wall of the cover barrel, and the plurality of hooking elements are respectively hooked and fixed to the corresponding plurality of hooking holes.

3. The cleaning bucket structure as claimed in claim 1, wherein an outer extension section is extended from the lower end of the linking barrel, a diameter of the outer extension section is smaller than a diameter of the linking barrel, two locking portions are respectively formed at two opposite sides of an outer peripheral wall of the outer extension section, an inner extension section is concavely and upwardly formed inside a bottom center of the pumping member, two recesses are respectively formed at two opposite sides of an inner peripheral wall of the inner extension section, the outer extension section inserts into the inner extension section, and the two locking portions are respectively fixed to the corresponding two recesses.

4. The cleaning bucket structure as claimed in claim 1, wherein a plurality of positioning grooves is formed at the peripheral wall of the rotation barrel, a plurality of positioning ribs is axially disposed at an inner peripheral wall of the linking barrel, and the plurality of positioning ribs are respectively disposed corresponding to the plurality of positioning grooves.

5. The cleaning bucket structure as claimed in claim 3, wherein at least one blade is spirally formed at an outer peripheral wall of the inner extension section of the pumping member.

6. The cleaning bucket structure as claimed in claim 4, wherein a plurality of pumping plates is axially disposed at an outer peripheral wall of the linking barrel.

7. The cleaning bucket structure as claimed in claim 1, further comprising a handle disposed at an upper end of the inner bucket.

8. The cleaning bucket structure as claimed in claim 1, wherein an inclined surface is formed at a top end of the pumping member.

9. The cleaning bucket structure as claimed in claim 1, wherein a wedging ring portion is formed at an upper end of the inner bucket for wedging and fixing to an upper end of the outer bucket.

* * * * *